(12) United States Patent
Cho et al.

(10) Patent No.: US 11,159,952 B2
(45) Date of Patent: Oct. 26, 2021

(54) ANALYSIS METHOD AND DEVICE FOR NETWORK DESIGN IN WIRELESS COMMUNICATION SYSTEM

(71) Applicant: SAMSUNG ELECTRONICS CO., LTD., Suwon-si (KR)

(72) Inventors: Minsung Cho, Seoul (KR); Donghyuck Park, Yongin-si (KR); Sungbum Park, Seoul (KR); Sungrok Yoon, Seoul (KR); Sanghyun Chang, Seoul (KR); Sungkyu Jung, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/648,441

(22) PCT Filed: Dec. 15, 2017

(86) PCT No.: PCT/KR2017/014875
§ 371 (c)(1),
(2) Date: Mar. 18, 2020

(87) PCT Pub. No.: WO2019/066148
PCT Pub. Date: Apr. 4, 2019

(65) Prior Publication Data
US 2020/0221314 A1 Jul. 9, 2020

(30) Foreign Application Priority Data

Sep. 27, 2017 (KR) .......................... 10-2017-0125073

(51) Int. Cl.
*H04W 16/18* (2009.01)
(52) U.S. Cl.
CPC .................................. *H04W 16/18* (2013.01)
(58) Field of Classification Search
CPC ...... H04W 16/18; H04W 28/02; H04W 16/24
See application file for complete search history.

(56) References Cited

U.S. PATENT DOCUMENTS 4,144,496 A * 3/1979 Cunningham ....... H04B 7/2621
455/447
5,465,390 A * 11/1995 Cohen ................... H04W 16/18
455/423
(Continued)

FOREIGN PATENT DOCUMENTS

EP        1 414 257        4/2004
JP        2011-234091      11/2011
(Continued)

OTHER PUBLICATIONS

International Search Report for PCT/KR2017/014875, dated Jun. 18, 2018, 4 pages.
(Continued)

*Primary Examiner* — Julio R Perez
(74) *Attorney, Agent, or Firm* — Nixon & Vanderhye, P.C.

(57) ABSTRACT

Disclosed is research carried out by receiving support from the "Cross-Ministry Giga KOREA Project" funded by the government (Ministry of Science and ICT) in 2017 (No. GK17N0100, millimeter wave 5G mobile communication system development). Disclosed are: a communication technique for merging, with IoT technology, a 5G communication system for supporting a data transmission rate higher than that of 4G system; and a system therefor. The present disclosure can be applied to intelligent services (for example, smart home, smart building, smart city, smart car or connected car, healthcare, digital education, retail, security, and safety related services, and the like) on the basis of 5G communication technology and IoT-related technology. Disclosed are an analysis method and device for improving the accuracy and the reliability of a network design result.

12 Claims, 17 Drawing Sheets

(56) References Cited

U.S. PATENT DOCUMENTS

| | | | | |
|---|---|---|---|---|
| 5,561,841 | A * | 10/1996 | Markus | H04W 16/18 455/446 |
| 6,971,063 | B1 * | 11/2005 | Rappaport | H04W 16/20 715/733 |
| 6,973,622 | B1 * | 12/2005 | Rappaport | H04L 41/145 703/21 |
| 7,085,697 | B1 * | 8/2006 | Rappaport | H04L 41/145 455/422.1 |
| 7,130,634 | B1 * | 10/2006 | Clemens | H04W 16/18 455/446 |
| 7,315,743 | B1 | 1/2008 | Frank et al. | |
| 9,037,142 | B2 | 5/2015 | Jovanovic et al. | |
| 2004/0127224 | A1 * | 7/2004 | Furukawa | H04W 16/18 455/446 |
| 2006/0019679 | A1 * | 1/2006 | Rappaport | G01S 5/0252 455/456.5 |
| 2011/0182174 | A1 * | 7/2011 | Pi | H04W 88/10 370/229 |
| 2013/0115961 | A1 * | 5/2013 | Shibayama | H04W 16/18 455/446 |
| 2016/0330643 | A1 | 11/2016 | Sahin et al. | |
| 2016/0353404 | A1 | 12/2016 | Gupta et al. | |
| 2017/0150365 | A1 | 5/2017 | Goswami et al. | |

FOREIGN PATENT DOCUMENTS

| | | |
|---|---|---|
| JP | 2016-184898 | 10/2016 |
| KR | 10-2010-0079433 | 7/2010 |
| WO | 93/15591 | 8/1993 |

OTHER PUBLICATIONS

Written Opinion of the ISA for PCT/KR2017/014875, dated Jun. 18, 2018, 7 pages.

Extended European Search Report dated Jul. 31, 2020 in counterpart EP Application No. 17927283.6.

* cited by examiner

FIG. 11

| ROAD idx | LENGTH OF ROAD | CURVATURE OF ROAD | EXISTENCE OF INTERSECTION | CONNECTED ROAD idx | NEARBY STREET |
|---|---|---|---|---|---|
| ROAD 1 | 310m | 3° | 2 | 8, 9 | 0, 70, 140 ... |
| ROAD 2 | 230m | 60° | - | x, y, zzz | 1111 |
| ... | ... | ... | ... | ... | ... |

ANALYSIS METHOD AND DEVICE FOR NETWORK DESIGN IN WIRELESS COMMUNICATION SYSTEM

This application is the U.S. national phase of International Application No. PCT/KR2017/014875 filed 15 Dec. 2017, which designated the U.S. and claims priority to KR Patent Application No. 10-2017-0125073 filed 27 Sep. 2017, the entire contents of each of which are hereby incorporated by reference.

TECHNICAL FIELD

The disclosure relates to a wireless communication system and, more particularly, to an analysis method and device for network design in a wireless communication system.

DESCRIPTION OF RELATED ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System".

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in the 5G communication system, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human-centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

Meanwhile, in the 5G communication system, use of a higher frequency band than those of the conventional systems is considered. However, a high frequency band has a short signal wavelength and thus may have a large path loss. Accordingly, it is necessary to consider these propagation characteristics in the analysis process for network design.

Disclosed is a research carried out by receiving support from the "Cross-Ministry Giga KOREA Project" funded by the government (Ministry of Science and ICT) in 2017 (No. GK17N0100, millimeter wave 5G mobile communication system development).

SUMMARY

Embodiments of the disclosure is derived to solve the above problems, and it is an aspect of the disclosure to improve the accuracy of the analysis results for the installation position and the number of base stations in the network design.

Embodiments of the disclosure is to derive an accurate result in the process of deriving the initial quantity before performing a long time-consuming precision analysis process and aims to perform a realistic analysis by reflecting the characteristics of the frequency band.

An analysis method for solving the above problems according to an embodiment of the disclosure includes: obtaining map data of an area; generating road information related to the road distribution in the area, based on the map data; and determining a plurality of candidate locations where a base station is to be located in the area, based on the road information.

An operating device for performing the analysis method for solving the above problems according to an embodiment of the disclosure includes a transceiver for transmitting and receiving information, and a controller configured to: obtain map data of an area; generate road information related to roads distributed in the area, based on the map data; and determine a plurality of candidate locations where a base station is to be located in the area, based on the road information.

According to an embodiment proposed in the disclosure, it is possible to quickly respond to review the initial required quantity and business feasibility before performing the detailed analysis process.

According to another embodiment proposed in the disclosure, it is possible to obtain a realistic and reliable result by considering the propagation characteristics of a communication system using a high frequency band.

BRIEF DESCRIPTION OF THE DRAWINGS

FIG. 11 is a view illustrating a table used in an analysis method according to a proposed embodiment;

DETAILED DESCRIPTION OF EXAMPLE EMBODIMENTS

Figure 1B:
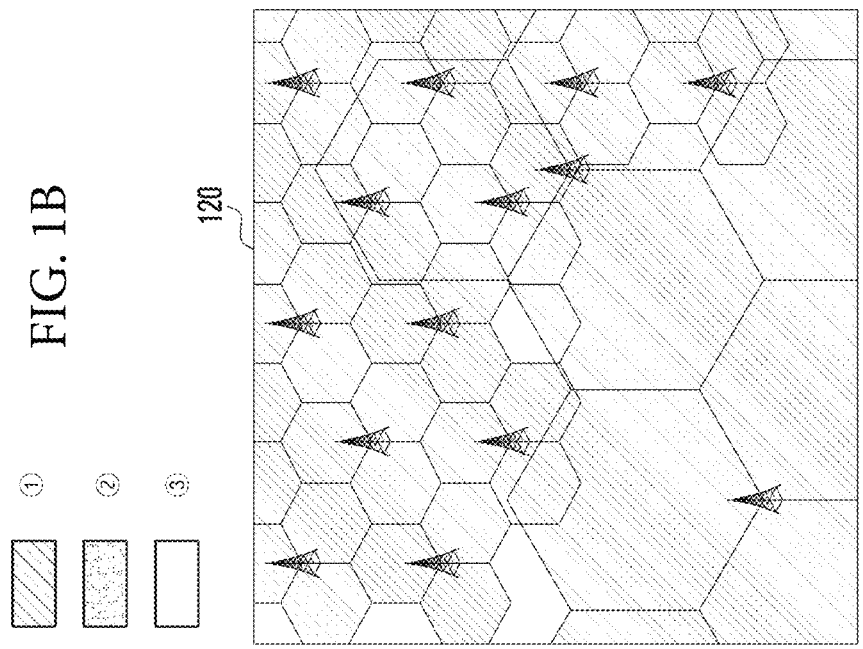
FIGS. 1A and 1B are views illustrating a network design (or, cell design) method.

Hereinafter, exemplary embodiments of the disclosure will be described in detail with reference to the accompanying drawings. It should be noted that, in the drawings, identical or corresponding elements are designated by identical reference signs as far as possible. Further, a detailed description of known functions or configurations incorporated herein will be omitted when it may make the subject matter of the disclosure rather unclear.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

Hereinafter, preferred embodiments of the disclosure will be described in detail with reference to the accompanying drawings.

Figure 1A:
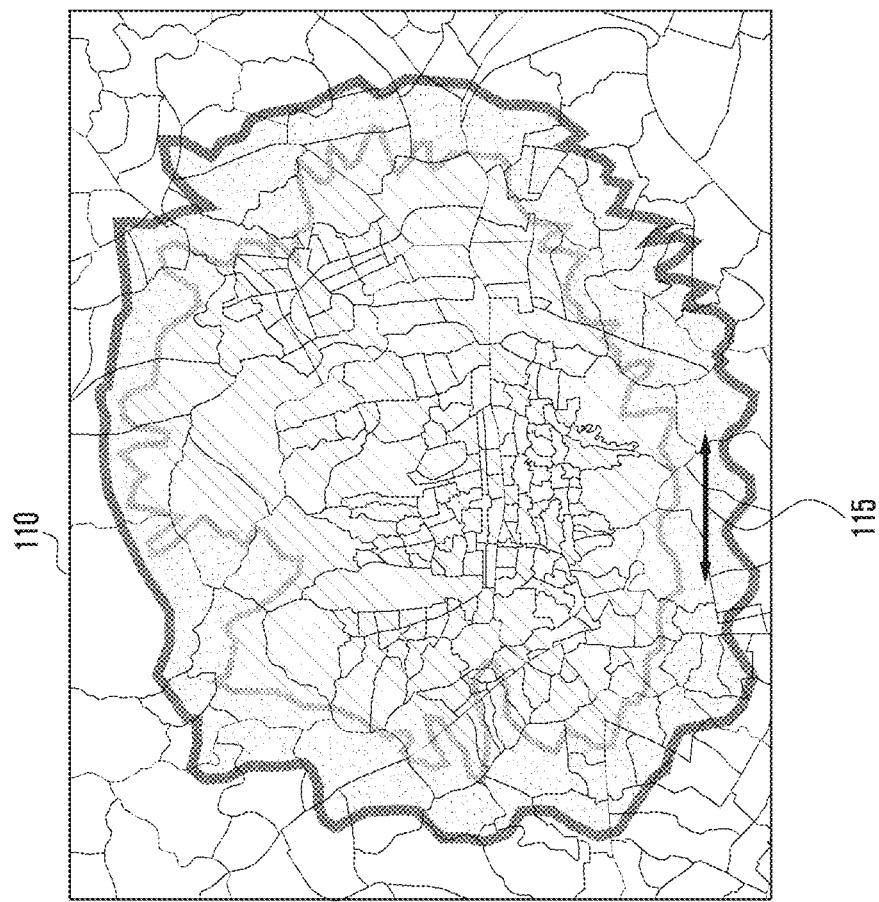

FIGS. 1A and 1B are views illustrating a network design (or, cell design) method. Network design (or cell design) refers to a process of selecting a location where a base station is installed in a specific area according to a request of a communication network operator. That is, candidate locations for installing a plurality of base stations may be determined via a network design process, and a candidate quantity of base stations in a corresponding area may also be determined.

FIGS. 1A and 1B are views illustrating a network design method in a conventional communication system. The base station of the conventional communication system generally has a large coverage of 500 m or more 115 between base stations and is performed via a simulation 110 in a wide area due to the propagation characteristics.

In addition, although the design was made through the hexagon cell arrangement structure 120 as shown in FIG. 1B instead of the simulation 110 method, in the case of the hexagon cell arrangement structure 120, there is a limit that the result is not accurate because it derives a tendency different from the reality.

Figure 2:
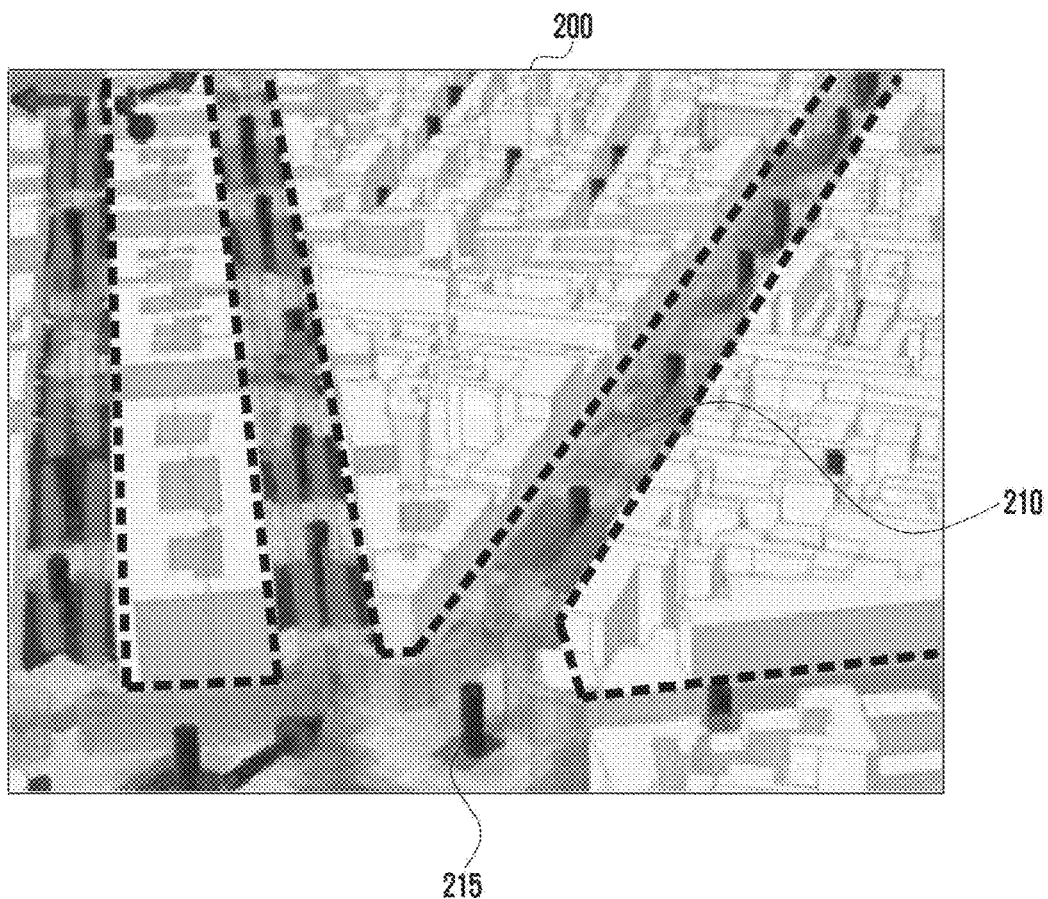
FIG. 2 is a view illustrating a communication system to which the proposed embodiment is applied.

FIG. 2 is a view illustrating a communication system to which the proposed embodiment is applied. New communication systems using the mmWave frequency band require new network design methods due to the propagation characteristics. This is because, in the new communication system, a domain path is formed mainly on the road due to the propagation characteristics, and thus, analysis time may be very long if the simulation method (e.g., ray tracing method) of FIG. 1A is applied as it is. In addition, as shown in FIG. 1B, the hexagon cell arrangement structure is completely different from tendency of the communication system using the mmWave band, and thus, it is difficult to apply it as it is.

Specifically, the method using the hexagon cell layout structure calculates the ratio of the total area to the unit area according to the link budget to derive the quantity of the base station, or calculates the placement density of the base station, based in the differential reference for each morphology. However, this method has a limitation in that it cannot reflect accurate terrain information because it is based on planar terrain and cannot accurately reflect the boundary area between morphologies, so the accuracy of the result is not reliable. In addition, there is a problem that it is difficult to consider the height of the base station or the antenna beamforming configuration.

Furthermore, in the case of the mmWave frequency band, the wavelength of a frequency is relatively short, so that the path loss if prominent due to the propagation characteristics. Accordingly, the component that is going straight is transmitted mainly, rather than the component that is diffracted or reflected. Referring to the area 200 illustrated in FIG. 2 as an example, it can be seen that the signal is strongly detected mainly around the road (210), and it can be seen that the signal is mainly distributed in a road or an intersection close to the base station 215 (or the transmission and reception pint (TRP)).

In accordance with this, the signal difference between the road and other area is large and the signal propagation trend due to the surrounding structures such as trees or streetlamps is large. Accordingly, it can be seen that in the case of a communication system using the mmWave band, a trend due to the road structure and the surrounding environment is more noticeable than a wide regional characteristic. Accordingly, it is important to consider the road structure and the surrounding environment in the network design process. Hereinafter, a network design method considering the road information and the surrounding environment information is proposed via the proposed embodiment.

Figure 3:
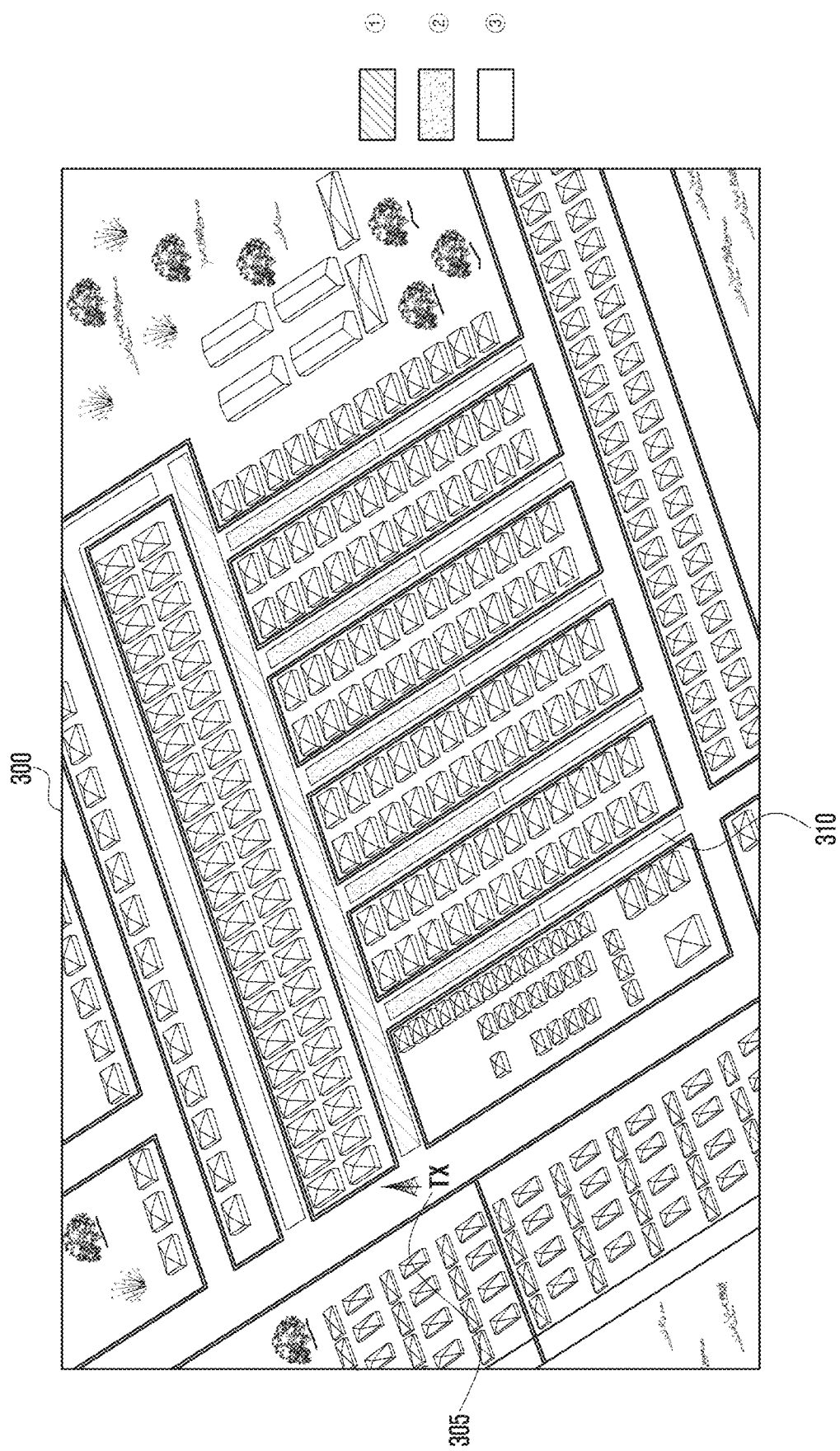
FIG. 3 is a view illustrating an environment to which an analysis method according to a proposed embodiment is applied.
Figure 4:
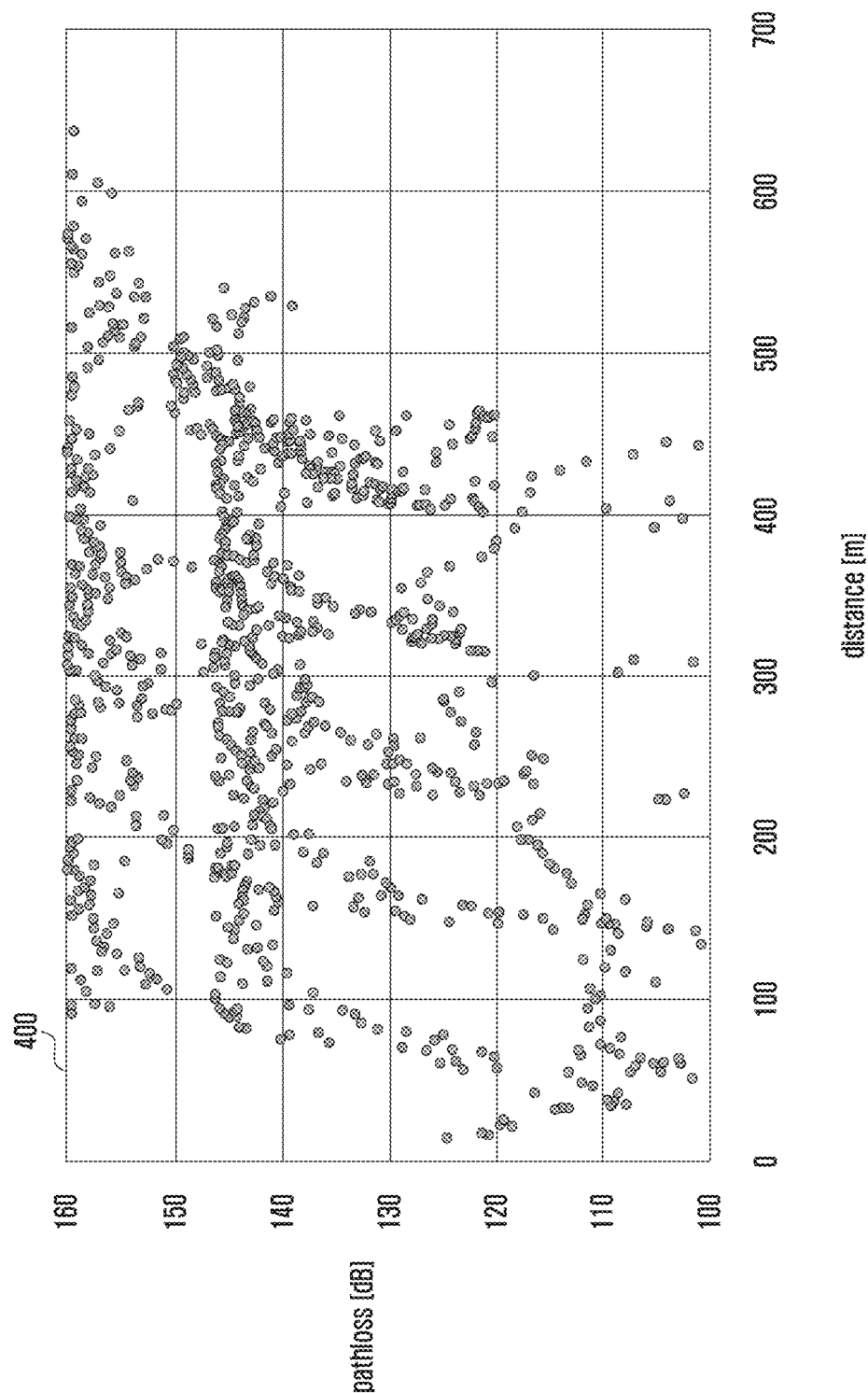
FIG. 4 is a view illustrating an environment to which an analysis method according to a proposed embodiment is applied.
Figure 5:
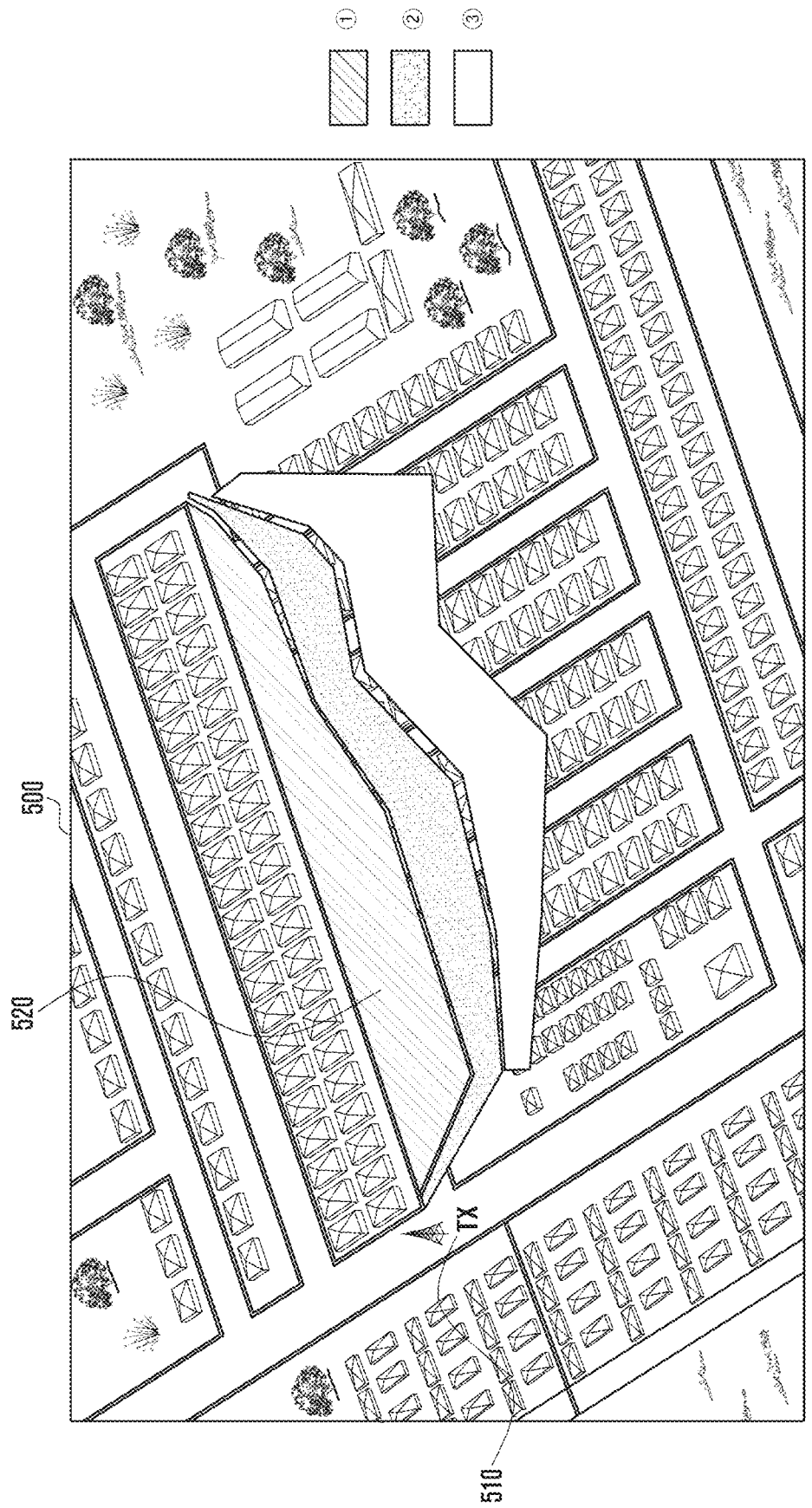
FIG. 5 is a view illustrating an environment to which an analysis method according to a proposed embodiment is applied.

In FIGS. 3 to 5 below, the propagation characteristics related to the proposed embodiment will be described in detail.

FIG. 3 is a view illustrating an environment to which an analysis method according to a proposed embodiment is applied. In FIG. 3, a map 300 for a particular area is illustrated as an example. The data of the map may be received from an external entity that stores and manages the map or may be data that is owned and managed by an operating device (e.g., a server) that performs network design.

In FIG. 3, the propagation characteristics and results of the communication system using the mmWave band are described. In the embodiment illustrated in FIG. 3, when a signal having a predetermined intensity is transmitted from an arbitrary location 305, a path loss characteristic is plotted and displayed for each road (310). As illustrated in FIG. 3, it can be seen that the signal travels relatively well along the road from location 305, but the signal does not pass through buildings nearby the road.

In addition, the signal transmitted from location 305 undergoes a path loss as it travels along the road, and the extent of this path loss is indicated by the degree of darkness in FIG. 3. In FIG. 3, the shaded areas are areas where the signal arrives relatively strongly (i.e., low path loss), the dotted areas are areas where the signal arrives medium intensity (i.e., medium path loss), and the empty areas are areas where the signal arrives relatively weak (i.e., high path loss). The area without any indication indicates that the signal hardly arrives due to the propagation characteristics of the high frequency band as described above.

FIG. 4 is a view illustrating an environment to which an analysis method according to a proposed embodiment is applied. FIG. 4 graphically illustrates the propagation characteristics described with reference to FIG. 3, where the horizontal axis of FIG. 4 represents a distance from location 305 in FIG. 3 and the vertical axis of FIG. 4 represents a path loss degree of a signal. As can be seen from graph 400 of FIG. 4, as the distance from the signal transmission location increases, the signal intensity does not decrease linearly, but the path loss degree of the signal is high or low according to the distribution on the map.

FIG. 5 is a view illustrating an environment to which an analysis method according to a proposed embodiment is applied. FIG. 5 schematically shows the results described with reference FIGS. 3 and 4. That is, in FIG. 5, a path loss of a signal generated by propagating a signal transmitted at a location 510 of the map 500 of the area described in FIG. 3 is converted into an area and displayed. In the area 520 where the path loss is displayed, the area indicated by the shaded area, the dotted area, and the blank area respectively represent the area of the signal intensity changes shown in FIG. 3.

As can be seen in FIGS. 3 to 5, in the case of the mmWave communication system, the propagation characteristics are highly dependent on the road and the surrounding environment. In other words, the transmitted propagation characteristics are similar within the same road, which means that the propagation characteristics should be taken into consideration when selecting an arrangement location of a base station in designing a network.

In FIGS. 6 to 15, embodiments of an analysis method for designing a network are described in detail in consideration of the propagation characteristics described above. In the proposed embodiment, accurate and reliable network design is performed by extracting road information and environment information from map data (e.g., digital map or satellite image) of a specific area to be analyzed for network design and utilizing the extracted road information and environment information from the map data.

In this case, the proposed analysis method (i.e., the network design method) may be performed in a server (operating apparatus or device) separated from the base station. Hereinafter, a server (device or operating apparatus) for designing a network is provided to perform an analysis method which will be described later, but is not limited thereto. That is, the analysis method according to the proposed embodiment may be performed at the base station, or may be performed in a manner in which the analysis is performed at the base station and the server together and the results are shared.

Figure 6:
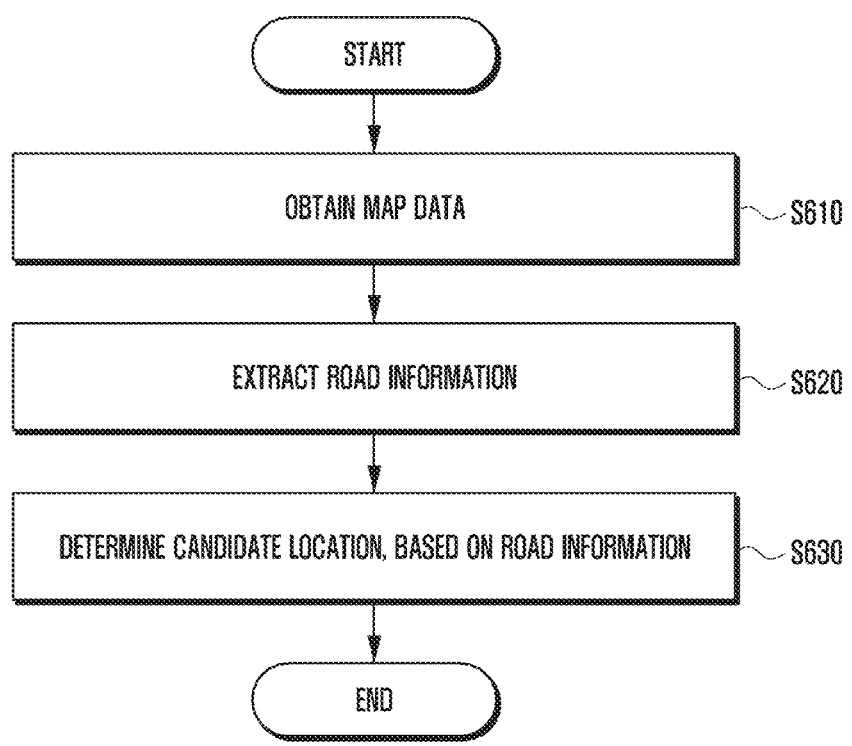
FIG. 6 is a flowchart illustrating an analysis method according to a proposed embodiment.

In FIG. 6, the server performing the analysis for network design obtains map data (S610). Such map data may be digital maps or satellite maps including information about roads, structures, and the like in a specific area targeted for network design as two-dimensional and/or three-dimensional data, and may also be a clutter map including clutter data of a structure such as lakes, houses, trees, or housing estates. As described above, the map data of S610 may be received from an external entity that stores and manages a map, or may be data that is owned and managed by a server that performs network design.

The server, which has obtained the map data, extracts road information in the corresponding area from the map data (S620). The server may generate road information by extracting an outline from the map data and generating a vector map via an image processing process, and may extract road information from the map data when the map data itself includes the road information. In this case, the road information may include not only the arrangement and structure of the roads in the area, but also various information related to the roads in the area, such as the length of each road, the distance between the roads, the curvature of the roads, and the number of roads at an intersection.

Subsequently, the server determines a plurality of candidate locations (or, nodes) on which the base station can be arranged, based on the road information of S620 (S630). As described above, because of the propagation characteristics of the signal transmitted along the road, the candidate locations may be determined at any point on the road within the area. For example, the candidate location may be determined according to various methods and references, such as being determined by an intersection of the road, the end point of the blocked road, the point separated by a predetermined distance from the end of the road, or determined by a plurality of points that divide the long road over a certain distance.

Although not explicitly shown in FIG. 6, a predetermined reference value may be used before determining the candidate locations from the road information. The reference value may mean a statistical value collected to determine a candidate location or a query input from a user. For example, the reference value may include a statistical value of path loss by road type and may include an input for the performance of the base station to be disposed. Specifically, when the user knows in advance the performance of the base station to be disposed via the network design (e.g., transmission power, whether perform beamforming, or signal reach, etc.), a condition for determining a candidate location may be input to the server. This is because the number of base station required to cover the roads of the same length may vary according to the performance of the base station, and thus the candidate locations of the base station may vary.

This reference value may be information indicating a local characteristic as well as a parameter related to a base station to be installed. For example, the reference value may be information about an area of an area to be analyzed, a population number, a quality of service (QoS) of an area-specific service and a terrain characteristic of the area, or may be parameter value representing the above-described examples.

As described above, the candidate locations determined according to road information and reference values may be identified by coordinates on a map, and two or three-dimensional coordinates may be given to each candidate location. The server may configure the determined candidate locations in the form of a node tree, a list, or lookup table and store them in a database or a memory.

The above-described embodiments described with reference to FIG. 6 have described a process of determining candidate locations from map data as a first step of an analysis process for network design. Next, in FIG. 7, a process of calculating the number of base stations for covering an area using a plurality of candidate locations will be described.

The server selects an arbitrary candidate location from a plurality of candidate locations, and the selected candidate location becomes a reference candidate position (or reference node) in the calculation process described later (S710). The server performs an analysis according to a predetermined condition from the selected reference candidate location and reconfigures the candidate location (S720). Specifically, the server assumes that the base station is located at the reference candidate location and determines the area that the base station can cover according to a predetermined condition. In this case, the predetermined condition may mean the performance of the base station described above. For example, assuming that a signal transmitted by a base station can propagate up to 100 m along a road, if an arbitrary first candidate location is selected as the reference candidate location, the candidate location 200 m along the road from the first candidate location may be the second candidate location, which is the next candidate location. Even if other candidate locations exist in a straight distance between the first candidate location and the second candidate location, since additional coverage is difficult to obtain even if the base station is additionally disposed in the candidate locations, the additional coverage may be removed from the candidate location list.

In other words, the server begins the analysis process from any reference candidate location of the plurality of candidate locations. The server determines which of the candidate positions close to the reference candidate location is to be located according to a predetermined condition, and the determination process may be repeated for all candidate locations. It is advantageous from the point of view of minimizing the number of base stations that there is no overlapping coverage while calculating for the entire candidate location, but it is important to control the extent to which coverage is allowed because shadowed area may occur if overlapping coverage is not fully allowed. Accordingly, the degree of overlapping coverage may be one of predetermined conditions of S720.

In S720, while reconfiguring the candidate locations, the server may delete one or more candidate locations of all candidate locations. That is, the server may delete unnecessary candidate locations among the plurality of candidate locations in order to reduce the overlap of coverage. The server performing the processes S710 and S720 may calculate the number of base stations to be arranged according to the result of filtering the entire candidate locations.

Figure 7:
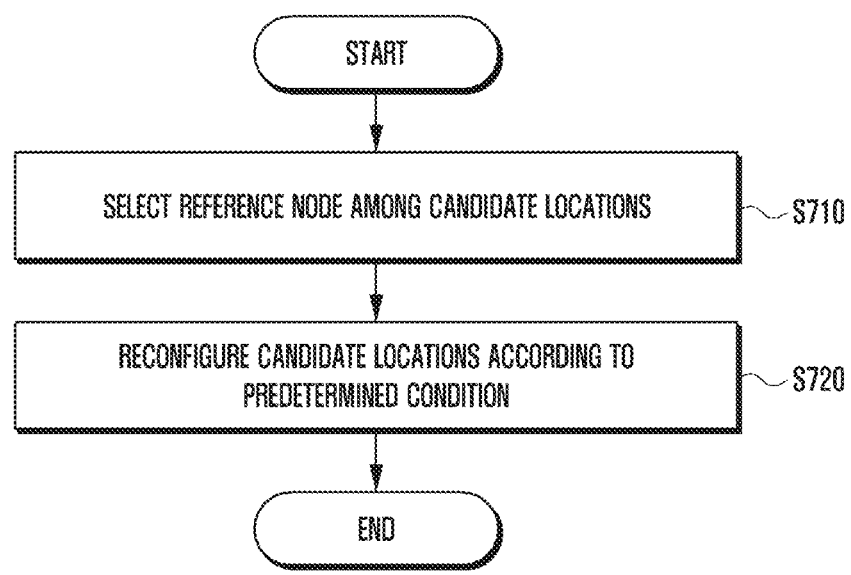
FIG. 7 is a flowchart illustrating an analysis method according to a proposed embodiment.

In FIG. 7, a process of calculating an installation location and a required quantity of base stations by reconfiguring candidate locations has been described. Next, a process of deriving an optimal result from the numbers of the plurality of cases will be described in FIG. 8.

Figure 8:
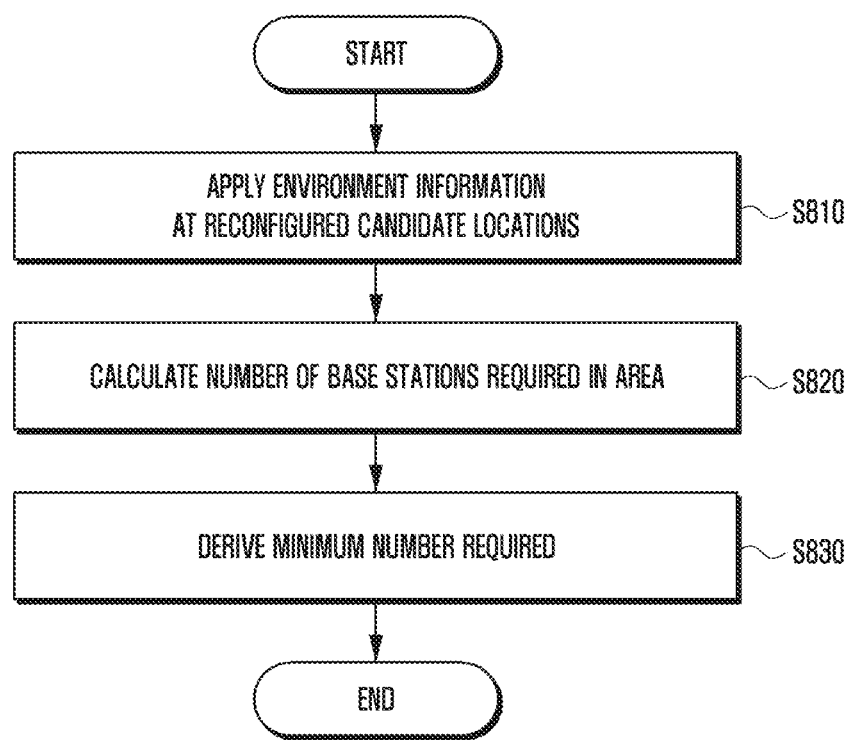
FIG. 8 is a flowchart illustrating an analysis method according to a proposed embodiment.

In FIG. 6 and FIG. 7, an embodiment of determining a candidate location of a base station by analyzing road information has been described. In FIG. 8, a process or reflecting environment information in addition to the above-described embodiment will be described. In S810, the server applies environment information to the reconstructed candidate location in S810. The environment information is distinguished from road information, if the road information is a vector map in which the road is regarded as a vector of straight lines, the environment information means an element about the width of the road, the number of nearby roads, an intersection of the road, and the surrounding structure (e.g., trees, buildings, streetlights, lakes, rivers, structures, etc.). That is, more accurate network design results can be derived by performing analysis by considering environment information in addition to the result calculated based on road information.

The environment information in S810 may be information generated via image processing by analyzing the above-described map data, or may be information generated by extracting information included in the map data (e.g., clutter map) itself.

By applying the environment information to the candidate positions reconstructed in FIG. 7, the server corrects the calculated result, based on the road information and calculates the required number of base stations again (S820). Referring to S820 as an example, even if the candidate location is reconfigured by calculating the signal transmitted from a base station to be reachable up to 100 m in a straight line, there may be a case where a large number of roadsides and buildings exist on the straight road and the signal is difficult to actually reach (e.g., reach up to 50 m). In this case, even if the predetermined reference value is 100 m, a new base station should be installed at a location 50 m away from any candidate location. As such, since a more accurate network design result can be obtained by reflecting the environment information, the server calculates the required quantity by applying the environment information to the reconstructed candidate location (S820).

The server may perform operation S820 for all the reconstructed candidate locations, add some candidate locations to the reconstructed candidate locations, or modify the reconstructed candidate locations. The server may finally calculate the required quantity and candidate locations of the base stations designed in the area from the modified result (S830).

Meanwhile, in S710 of FIG. 7, the server selects an arbitrary reference candidate location among all candidate locations and reconfigures the candidate locations accordingly. At this time, if the server selects the arbitrary reference candidate location differently, the result of the candidate location will be different. That is, the server may repeatedly perform the process according to the embodiments described with reference to FIGS. 7 and 8 by changing the reference candidate location, thereby deriving a minimum required quantity and a corresponding candidate location in a specific area (S830). This embodiment will be described in detail with reference to FIGS. 13 to 15.

Meanwhile, the above-described embodiments in which the server reconfigures the candidate location according to the road information and changes or modifies the result of the candidate location in consideration of the environment information. However, the proposed embodiment is not limited to this method, and the server may reconfigure candidate locations in consideration of road information and environment information at the same time. In the latter case, the embodiments described separately in FIGS. 7 and 8 will operate in combination. The server repeatedly performs the processes of reconfiguring the candidate location in consideration of the road information and environment information from the arbitrary candidate location and reconfiguring another candidate location as the reference candidate location, thereby deriving the minimum required quantity for a specific area and the corresponding candidate location.

FIGS. 9 to 12 illustrate a process in which an analysis method is performed according to the embodiment described with reference to FIGS. 6 to 8 as an example.

Figure 9:
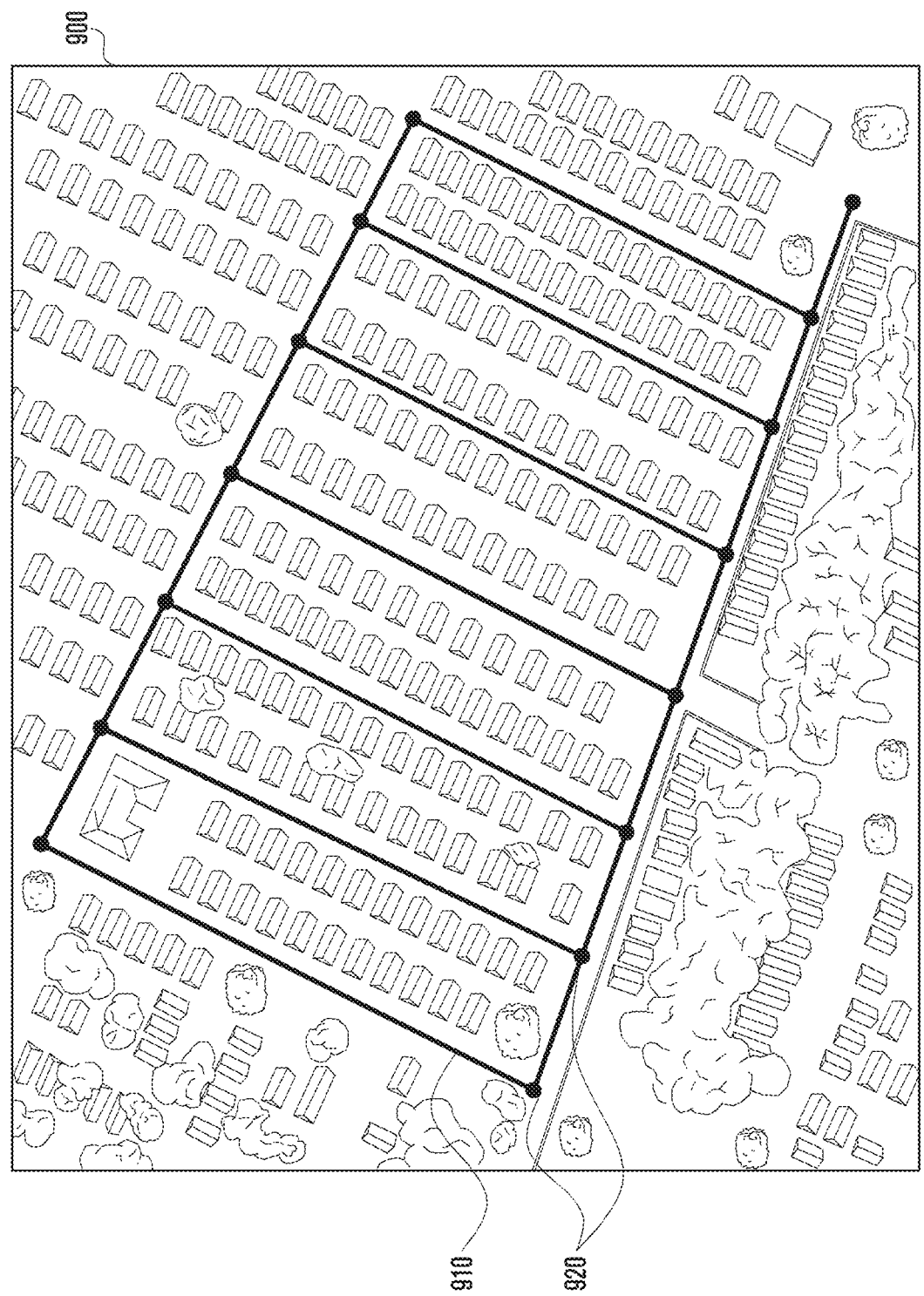
FIG. 9 is a view illustrating a process of an analysis method according to a proposed embodiment.

First, FIG. 9 illustrates an area where an analysis method for network design is to be performed (900). The server extracts road information from map data, and the extracted road information is represented in straight lines in FIG. 9. Meanwhile, the server may grasp not only the distribution form of the road, but also the distance of each road as shown in FIG. 9. The server may also identify the intersections 920 between the roads from the road information. In the embodiment shown in FIG. 9, the intersections between the roads become the plurality of candidate locations described above. This is because in the embodiment shown in FIG. 9, it is advantageous to install the base station at each intersection to cover the entire road, considering the fact that the propagation of radio waves straight along the road is prominent.

Figure 10:
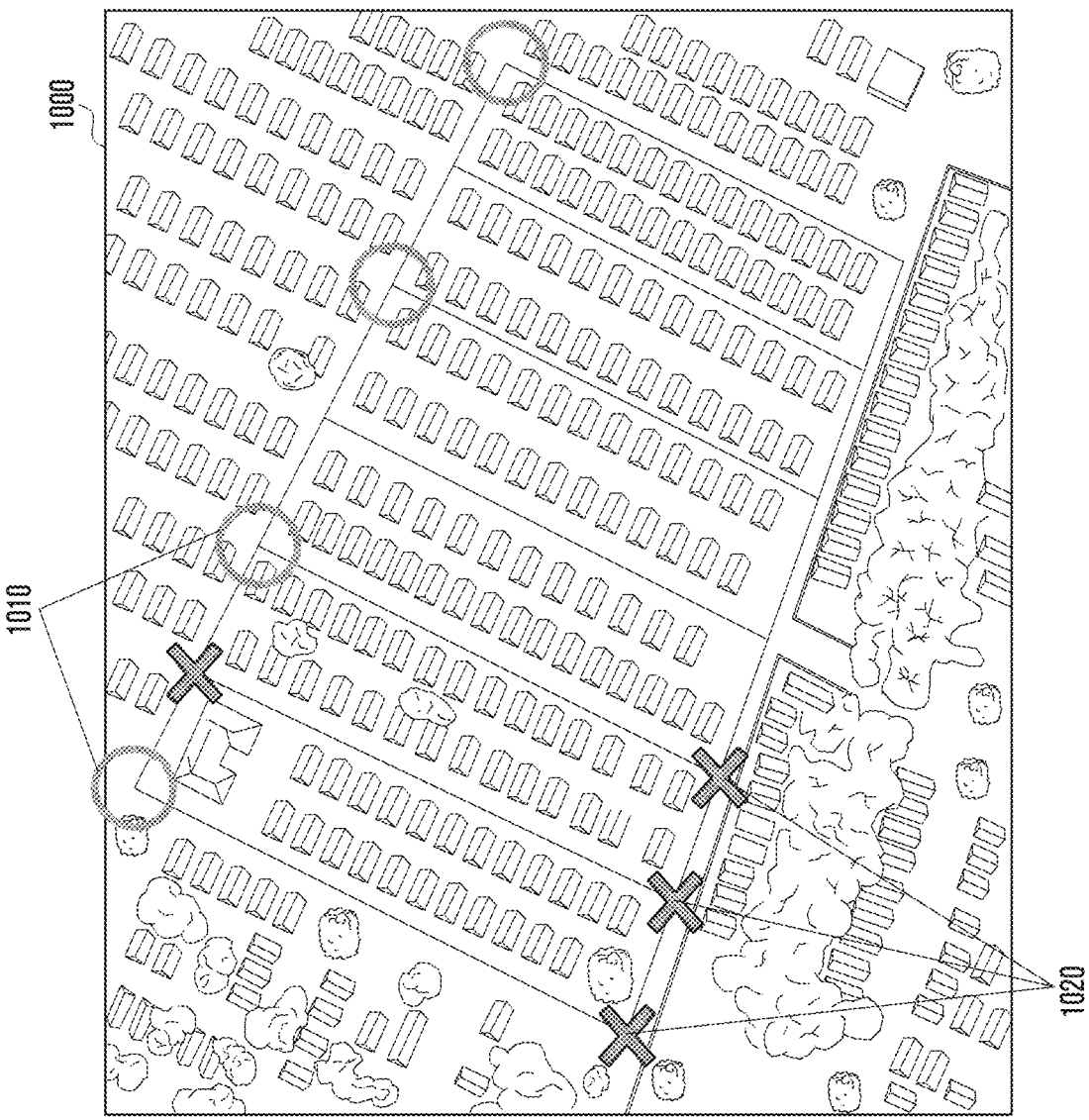
FIG. 10 is a view illustrating a process of an analysis method according to a proposed embodiment.

Next, in FIG. 10, the server selects an arbitrary candidate location as a reference candidate location (or, reference node) from the candidate location list, and reconfigures the entire candidate locations. Since the base station does not need to be located at all of the plurality of candidate locations as illustrated in FIG. 10, the server reconfigures the entire candidate location by deleting some candidate locations according to the reference value (or, reference parameter) from any reference node. The candidate locations selected in FIG. 10 are marked as 'O' (1010), and candidate locations deleted according to the reconfiguration are marked as 'X' (1020). In the embodiment of FIG. 10, the server may reconfigure a candidate location list by selecting a total of four candidate locations from the entire candidate locations.

The server considers both road information and environment information in the process of reconfiguring the candidate locations. That is, the server may reconfigure the candidate locations in consideration of the length of the road, the curvature of the road, the existence of an intersection, the information of other roads connected to the intersection, the distance of the adjacent road, and the like. In other words, the process of reconfiguring the candidate locations according to the road information and modifying the result again in consideration of the environment information has been described above with reference to FIG. 7 and FIG. 8, but is not limited thereto and the candidate locations may be reconfigured in consideration of both road and environment information.

FIG. 11 is a view illustrating an example of road information and environment information that a server considers in determining a candidate location. In the table 1100 illustrated in FIG. 11, an index for identifying a road, a road length, a road curvature, whether it is an intersection point, an index of another road to which the road is connected, and an adjacent distance between the roads are displayed as a table. The server may extract and store road information and environment information as shown in FIG. 11 from the map data and may be used in an analysis process for network design.

Figure 12:
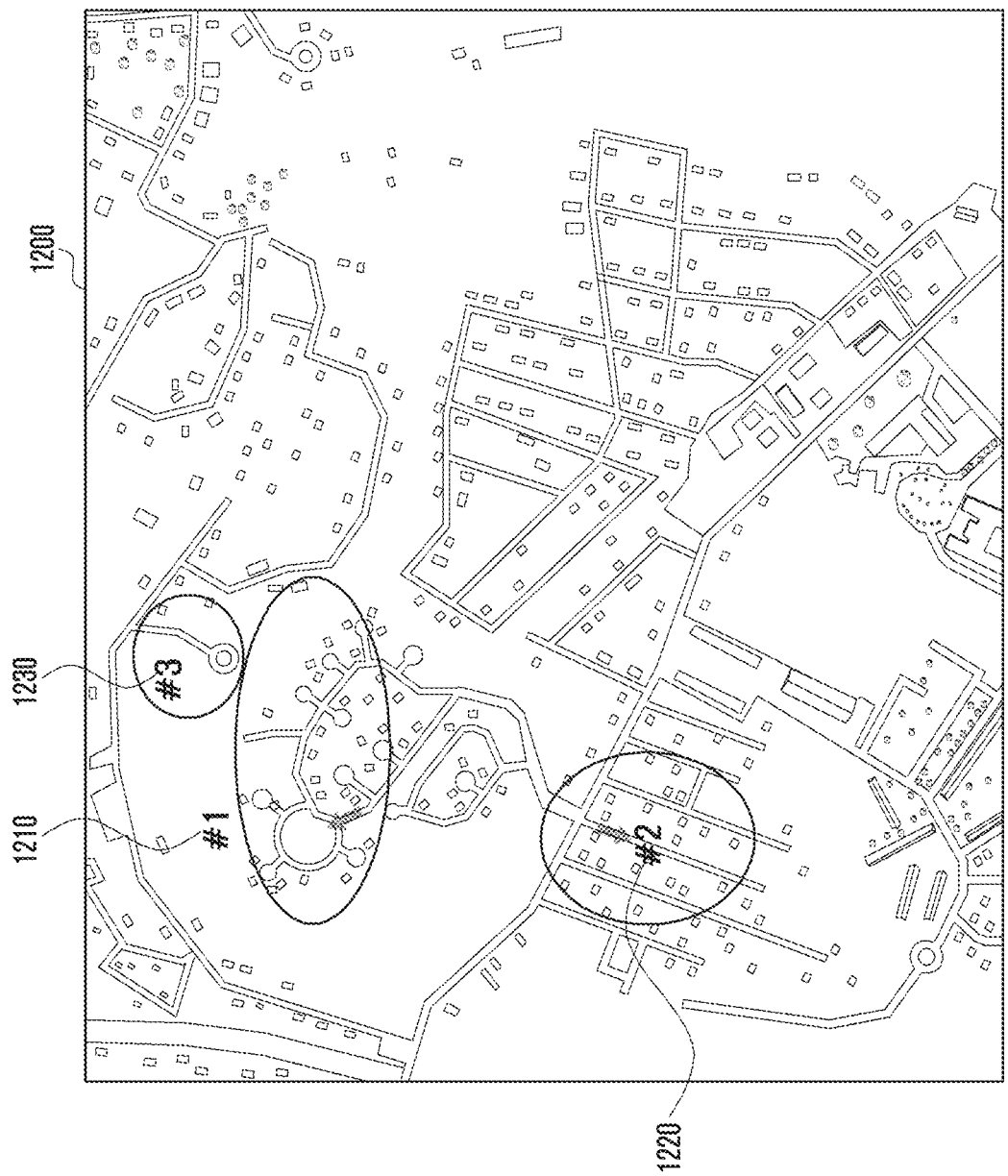
FIG. 12 is a view illustrating a process of an analysis method according to a proposed embodiment.

FIG. 12 is another view for describing the above-described embodiment. The server obtains map data for the region 1200, and generates and stores road information and/or environment information from the map data. In the case of the embodiment described with reference to FIGS. 9 and 10, since the roads are arranged in a straight line, the candidate locations are relatively simple.

In contrast, in the case of the embodiment of FIG. 12, the process of determining the candidate locations by the server from map data may be more complicated, and a reference value (or, a reference parameter) may be used for this purpose. For example, the server may allocate one base station to a road within a predetermined radius according to a reference value, based on a single road. The reference value for the radius for this process can be configured differently for straight roads and curved roads. Subsequently, for roads longer than a radius according to the reference value, the server may further place candidate locations at other intersections in the road. Also, if the start point or the end point of the road exists within a certain distance, based on the candidate locations, the server may exclude the corresponding candidate location. In addition, the server may additionally change or add/delete the candidate locations by applying weights to neighboring terrain, altitude, and structure of each candidate location in consideration of environment information. In other words, the server may consider road information or environment information in the process of configuring the candidate location list as well as the process of reconfiguring the candidate positions.

The server may derive the full candidate locations according to the conditions described above. The server then reconfigures the candidate locations, based on any candidate locations. Describing area #1 1210 of FIG. 12 as an example, the server may delete the candidate locations located on the road because the short roads of adjacent 40 m and 100 m are roads within the radius (400 m) according to the reference value, based on the location indicated by the arrow.

Describing area #2 1220 of FIG. 12 as an example, a neighboring road in parallel adjacent to the location indicated by the arrow is assumed to be close to the arrow location so that a signal from the arrow location will arrive along the road, and the server may delete the location from the candidate locations.

Describing area #3 1230 of FIG. 12 as an example, in the case of region #3, the server may not exclude from the candidate location because the signals from other adjacent locations are difficult to reach, but may exclude from the candidate locations if it is determined that the degree of coverage attainment within the area required by the reference value (or, reference parameter) is sufficient. That is, as described above, since the overlapping coverage and the allowable shadowing degree may vary according to the reference value, whether to reduce the required number of base stations by excluding area #3 from the candidate locations or to select the candidate location to increase the coverage achievement rate may vary depending on the reference value or parameter considered in the operation of the server.

Meanwhile, when the candidate locations are derived as a result of areas #1, #2, and #3 described above, the server stores and manages information about the derived candidate locations, which can then be used for analysis of other area with similar trends. For example, when an analysis process for network design is performed for a new area #4 (not shown), and area #4 has a similar tendency to road information and environment information of any one of REAS #1, #2, and #3, the server can use the analysis results that have been performed to perform network design analysis on the new area #4.

This is because road information can be derived as a vector map from map data of each area. That is, when it is identified that the road information vector map of one area has a similar trend to the vector map of another area, the result of the process of configuring the entire candidate positions may be the same. Therefore, the server can simplify the process of deriving the candidate positions from the road information and reconfigure the candidate positions by reflecting only the result of the environment information.

Figure 13:
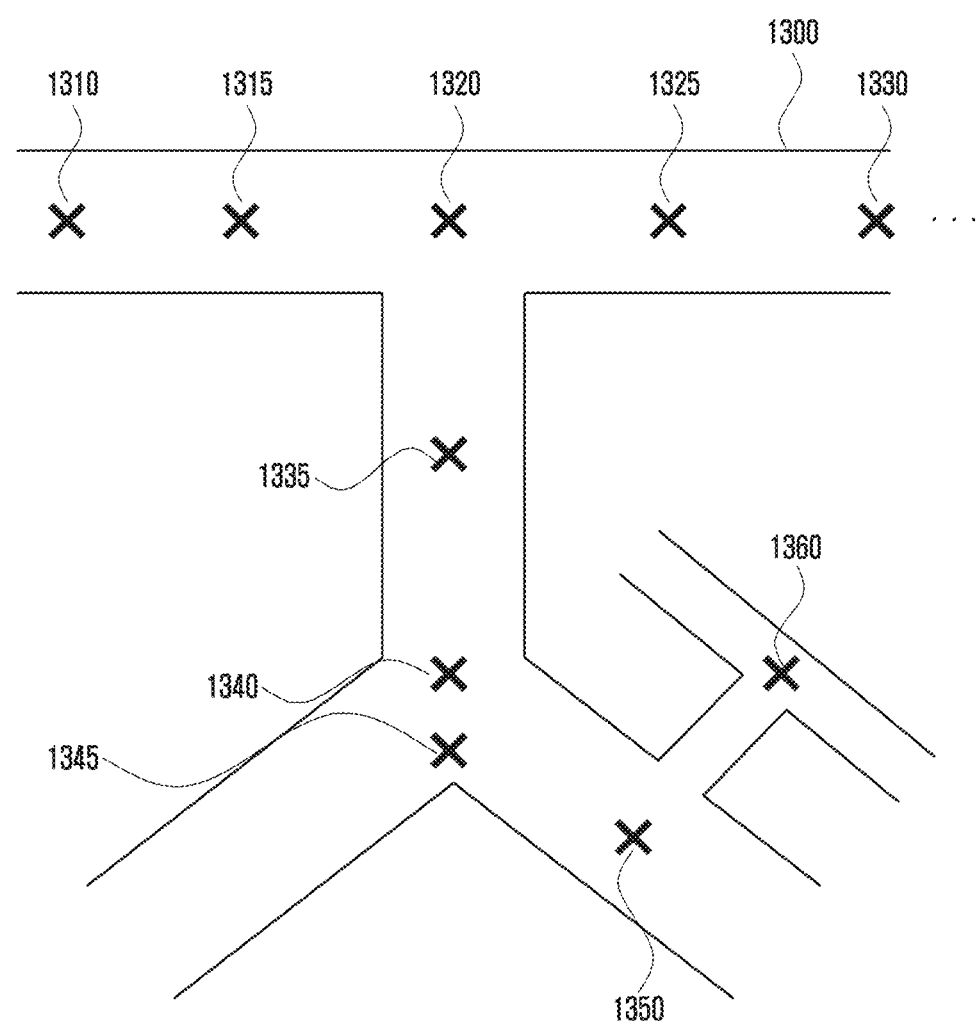
FIG. 13 is a view illustrating a process of an analysis method according to a proposed embodiment.
Figure 14:
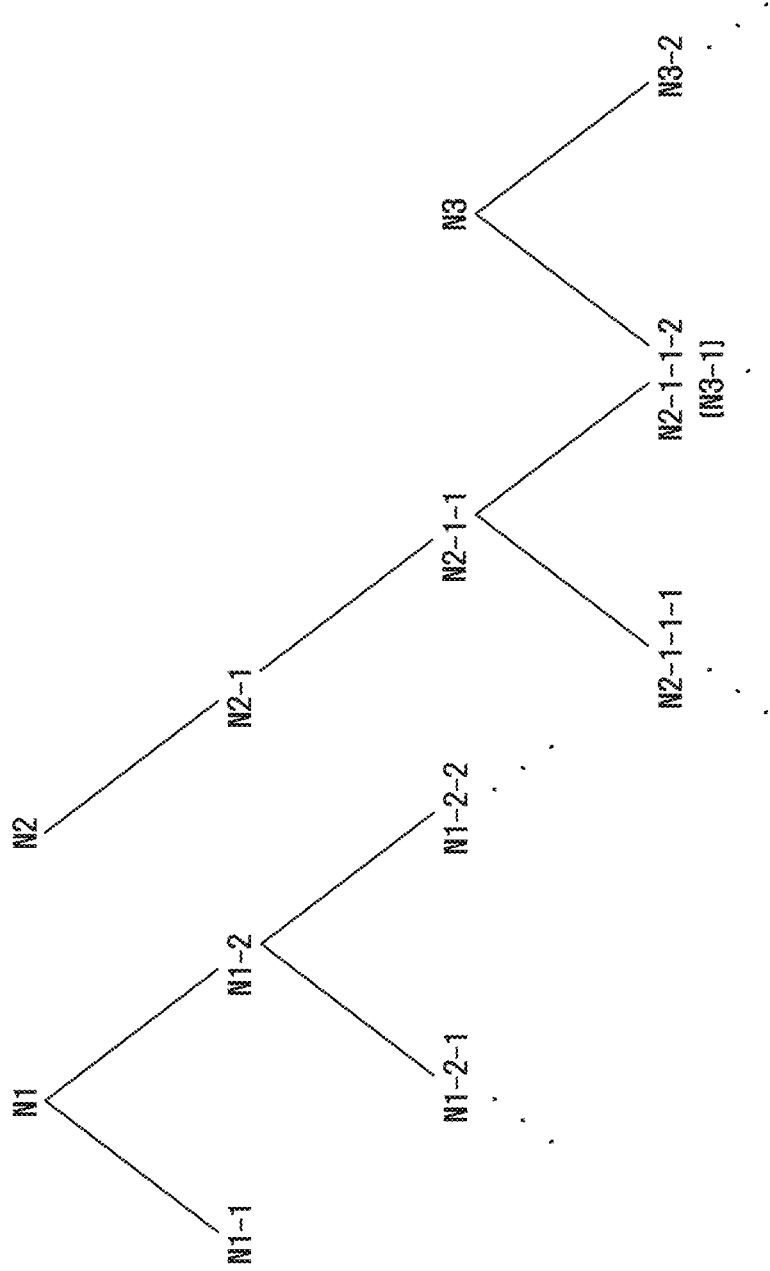
FIG. 14 is a view illustrating a process of an analysis method according to a proposed embodiment.
Figure 15:
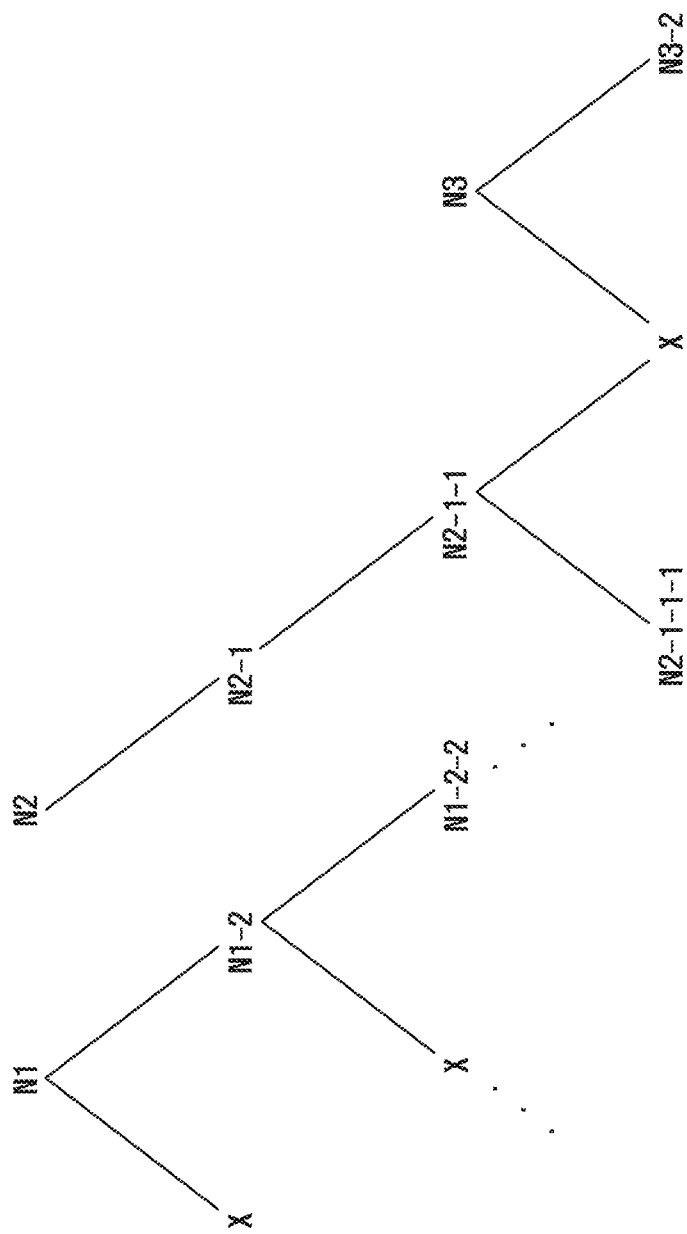
FIG. 15 is a view illustrating a process of an analysis method according to a proposed embodiment.

FIGS. 13 to 15 are views illustrating a process of an analysis method according to a proposed embodiment. FIGS. 13 to 15 illustrate the above-described candidate location reconfiguration process by way of example via the drawings.

Assume the road structure 1300 shown in FIG. 13. A server may extract road information and environment information from the map data of the area of FIG. 13, and determine a candidate location using the extracted road information and environment information. In the example illustrated in FIG. 13, a total of five candidate locations are determined according to road information and environment information (e.g., road length, signal transmission/reception capability of a base station, structure arrangement, etc.) on a road arranged in a horizontal direction (1310, 1315, 1320, 1325, and 1330). Subsequently, candidate locations 1335, 1340, and 1345 are determined along the road in the vertical direction, and the candidate locations 1350 and 1360 may be determined along the road in the lower right direction.

Meanwhile, if the base station selects an arbitrary reference candidate as 1315 among the entire candidate locations shown in FIG. 13, only two candidate locations 1315 and 1325 may be selected on the road in the horizontal direction, and the remaining three candidate locations 1310, 1320 and 1330 may be deleted according to the reference value. This is because selecting only two candidate locations is advantageous in terms of the total number of candidate locations (that is, the number of base station) in consideration of only roads in the horizontal direction.

However, if the candidate locations 1315 and 1325 are selected, the server may have to select both candidate locations 1335 and 1345 along the longitudinal road. This is because when the candidate locations 1315 and 1325 are selected and the candidate location 1320 is deleted, the path loss is likely to increase as a signal is transmitted along the longitudinal road.

On the other hand, if the three candidate locations 1310, 1320, and 1330 are selected on the horizontal road and the candidate locations 1315 and 1325 are deleted, since the signal may be transmitted from the candidate location 1320 to the vertical road, the server may delete the candidate location 1335 and select only the candidate location 1340.

As such, different results may be derived depending on how the server selects the reference candidate location in the process of reconfiguring the entire candidate location. Therefore, the server may perform the process of reconfiguring the candidate locations by changing the candidate locations in consideration of both road information and environment information, and may select a result having the smallest number of reconfigured candidate locations (i.e., the required number of base stations) among the total results.

Meanwhile, in FIG. 13, the candidate location 1350 may be selected as a candidate location because it is an intersection point connected to another road, and the candidate location 1360 may be selected as a candidate location for covering adjacent narrow roads. Meanwhile, in the case of the candidate location 1360, if it is determined that the coverage of the entire area is satisfied or the signal arrival from the candidate location 1350 is greater than or equal to a predetermined threshold, the candidate location 1360 may be deleted from the candidate location list.

FIGS. 14 and 15 are views conceptually illustrating the candidate location reconfiguration process described above. In FIG. 14, candidate locations that the server can select as reference candidate locations are N1, N2 and N3. Meanwhile, as the server selects the candidate location N1, the server determines which candidate location to select and which candidate location to delete among adjacent candidate locations N1-1 and N1-2. When the server selects the candidate location N1-2, N1-1 is deleted and a branch arrives where the candidate locations of N1-2-1 and N1-2-2 should be selected. Meanwhile, the server may select the N2 candidate location and may automatically select N2-1 candidate location and N2-1-1 candidate location from the candidate location list. Since the candidate location N2-1-1-2 is a branch that can be selected simultaneously from the candidate location N2-1-1 and the candidate location N3, the server may determine that selecting N2-1-1-2 from the candidate locations N2-1-1-1 and N2-1-1-2 is advantageous in terms of reducing the total number of candidate locations. This is because that if the server selects candidate location N2-1-1-1, candidate position N3-2 should be additionally selected, but if the server selects candidate location N2-1-1-2, candidate locations N2-1-1-1 and N3-2 can be deleted together.

FIG. 15 displays the results selected in FIG. 14 as described above. FIG. 15 illustrates the result of the server selecting the N2-1-1-1 candidate location and the N3-2 candidate location. This is because that it may be advantageous in that N2-1-1-2 is an intersection point between N2-1-1 candidate location and N3 candidate location as described with reference to FIG. 14, but it may be the opposite from an overall perspective of a specific area. That is, when it is determined that the selection of candidate locations N2-1-1-1 and N3-2 is advantageous in view of the overall candidate location reconfiguration result or advantageous in terms of reference values, parameters or road information or environment information considered in the analysis method, the server may delete the N2-1-1-2 candidate location because the server selects an optimal result by repeatedly performing the entire result.

According to the embodiments described above, by performing the analysis process in consideration of the road information and environment information in the area to be the network design target, the efficiency of the process of determining the number and location of the base station to be disposed can be improved. In particular, since the above-described embodiments reflect the characteristics of the communication system using the mmWave frequency band, the accuracy and reliability of the result can be improved, and a result close to a desired target can be provided by adjusting a reference value or a reference parameter for calculation.

Meanwhile, the above has been described the analysis method for the network design, the above embodiments can be applied to the same or similarly to the network operation process after the network design.

For example, the server performing the analysis method and the base station can share the analysis results. In this case, since the base station knows that the server has selected the candidate location according to the above-described process, the base station can use the result in the process of controlling beamforming and/or transmission power in the communication process. That is, when a specific candidate location is selected via reconfiguration, the base station located at the candidate location can know which area it should cover itself. Accordingly, the base station can perform efficient beamforming on the direction to be covered by itself, and can also selectively control power for signal transmission, thereby efficiently operating in terms of power control.

According to another embodiment, when a change occurs in local road information or environment information during network operation, the above-described embodiment may be used as a method for advancing the network. For example, if the population density of a particular area is improved and additional base stations need to be disposed, the server and/or the base station may additionally easily derive candidate locations using the above analysis results. This is because, if there are already disposed base stations, the reconfiguration process of candidate locations to consider for further disposing can be calculated relatively simply. That is, the server and/or the base station may perform a process of selecting candidate locations of some of the candidate locations deleted in the initial analysis process even without reconfiguring all candidate locations.

In this network enhancement process, the base station can efficiently perform the operation process with the terminal by sharing the analysis process and the result with the server as described above.

Figure 16:
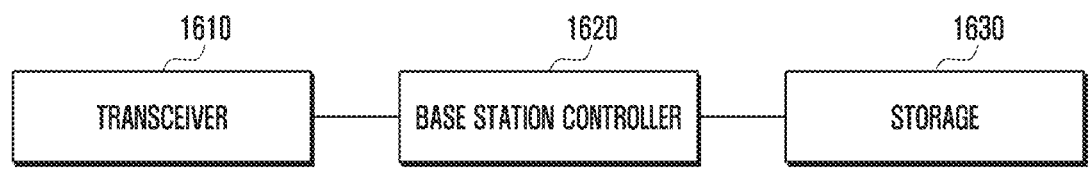
FIG. 16 is a block diagram illustrating a configuration of a base station according to an embodiment of the disclosure.

FIG. 16 is a block diagram illustrating a configuration of a base station according to an embodiment of the disclosure.

Referring to FIG. 16, the base station may include a transceiver 1610, a base station controller 1620, and a storage 1630. In the disclosure, the base station controller 1620 may be defined as a circuit or application specific integrated circuit or at least one processor.

The transceiver 1610 may exchange signals with another network entity. The transceiver 1610 may, for example, communicate with a server to transmit and receive an analysis result, or may perform communication with a terminal.

The base station controller 1620 may control the overall operation of the base station according to the embodiment proposed by the disclosure. For example, the base station controller 1620 may control a signal flow between blocks to perform an operation according to the above-described drawings and flowcharts. In detail, the base station controller 1620 may receive an analysis method while communicating with a server that performs an analysis method for network design, and may identify an analysis method and an analysis result so that efficient communication can be performed.

The storage 1630 may store at least one piece of information transmitted and received through the transceiver 1610 and information generated by the base station controller 1620.

Figure 17:
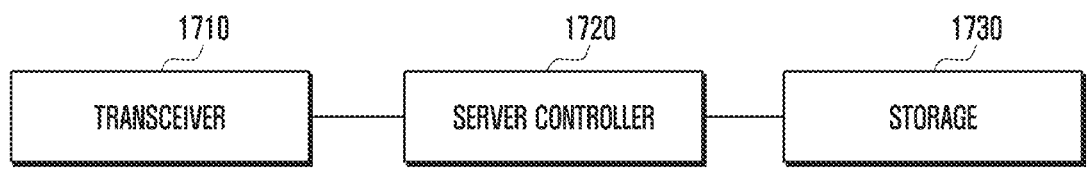
FIG. 17 is a block diagram illustrating a configuration of an operating device according to an embodiment of the disclosure.

FIG. 17 is a block diagram illustrating a configuration of an operating device (for example, a server) according to an embodiment of the disclosure.

Referring to FIG. 17, the server may include a transceiver 1710, a server controller 1720, and a storage 1730. In the disclosure, the server controller 1720 may be defined as a circuit or application specific integrated circuit or at least one processor.

The transceiver 1710 may exchange signals with another network entity. The transceiver 1710 may communicate with an external entity, for example, obtain map data, or transmit an analysis result to a base station.

The server controller 1720 may control the overall operation of the server according to the embodiment proposed by the disclosure. For example, the server controller 1720 may control a signal flow between blocks to perform an operation according to the above-described drawings and flowcharts. In detail, the server controller 1720 may generate road information and environment information from the map data, or may derive a candidate location and reconfigure the candidate locations using the road information and the environment information.

The storage 1730 may store at least one piece of information transmitted and received through the transceiver 1710 and information generated through the server controller 1720.

In addition, the above-described base station controller 1620 and server controller 1720 may be controlled by a program including instructions for executing the method described in the embodiments of the specification. In addition, the program may be stored in a storage medium, and the storage medium may include a volatile or nonvolatile memory. The memory may be a medium capable of storing data, and there is no limitation in the form thereof when the instruction can be stored.

The embodiments of the disclosure described and shown in the specification and the drawings have been presented to easily explain the technical contents of the disclosure and help understanding of the disclosure, and are not intended to limit the scope of the disclosure. Therefore, in addition to the embodiments disclosed herein, all changes and modifications derived on the basis of the technical idea of the disclosure should be construed as falling within the scope of the disclosure.

What is claimed is:

1. A method performed by a computing device for network design in a wireless communication system, the method comprising:
    obtaining, by a processor of the computing device, map data of an area;
    generating, by the processor, road information related to roads distributed in the area, based on the map data;
    determining, by the processor, a plurality of candidate locations where each base station (BS) is to be disposed in the area, based on the road information;
    determining, by the processor, a plurality of candidate configurations of BS locations for the area, wherein the determining of the plurality of candidate configurations comprises:
        selecting a reference candidate location, from among the plurality of candidate locations, for each of the plurality of candidate configurations; and
        identifying remainder candidate locations corresponding to the reference candidate location from among the plurality of candidate locations, based on a predetermined condition, for each of the plurality of candidate configurations; and
    determining, by the processor, a configuration of BS locations for the area from among the plurality of candidate configurations, based on a number of BS locations included in each of the plurality of candidate configurations,
    wherein BSs disposed at each of BS locations communicate using an mmWave frequency band.

2. The method of claim 1, wherein the road information comprises at least one of lengths of roads distributed in the area, curvatures of roads, information on adjacent roads, or identifiers for identifying each road, and wherein the road information comprises a vector map.

3. The method of claim 1, further comprising generating, by the processor, environment information for the area, based on the map data, wherein the plurality of candidate locations are determined based on the road information and the environment information, and wherein the environment information comprises information on at least one of trees, streetlights, lakes, or structures distributed in the area.

4. The method of claim 1, wherein the determining of the plurality of candidate locations is performed based on a reference parameter for determining the candidate locations, and wherein the reference parameter comprises a value for at least one of statistical values of path loss, transmission power of the base station, whether the base station performs beamforming, signal arrival distance of the base station, area of the area, population of the area, service related information to be provided to the area, or terrain properties of the area.

5. The method of claim 1, wherein the remainder candidate locations are identified by excluding unsatisfied candidate locations, which do not meet the predetermined condition, from the candidate locations in the area, and wherein the predetermined condition is to reduce duplication of coverage of the candidate locations with respect to the reference candidate location.

6. The method of claim 5, wherein the predetermined condition is to reduce shadow areas in the area with respect to the reference candidate location.

7. A computing device performing analysis for network design in a wireless communication system, the computing device comprising:
    a transceiver configured to transmit and receive information; and
    a processor configured to:
        obtain map data of an area,
        generate road information related to roads distributed in the area, based on the map data,
        determine a plurality of candidate locations where each base station (BS) is to be disposed in the area, based on the road information,
        determine a plurality of candidate configurations of BS locations for the area, wherein the processor is configured to determine the plurality of candidate configurations by selecting a reference candidate location from among the plurality of candidate locations and identifying remainder candidate locations corresponding to the reference candidate location from among the plurality of candidate locations, based on a predetermined condition, for each of the plurality of candidate configurations; and
        determine a configuration of BS locations for the area from among the plurality of candidate configurations, based on a number of BS locations included in each of the plurality of candidate configurations,
    wherein BSs disposed at each of BS locations communicate using an mmWave frequency band.

8. The computing device of claim 7, wherein the road information comprises at least one of lengths of roads distributed in the area, curvatures of roads, information on adjacent roads, or identifiers for identifying each road, and wherein the road information is composed of a vector map.

9. The computing device of claim 7, wherein the processor is configured to generate environment information for the area, based on the map data, and wherein the plurality of candidate locations are determined based on the road information and the environment information, and wherein the environment information comprises information on at least one of trees, streetlights, lakes, or structures distributed in the area.

10. The computing device of claim 7, wherein the plurality of candidate locations are determined based on a reference parameter for determining the plurality of candidate locations, and wherein the reference parameter comprises a value for at least one of statistical values of path loss, transmission power of the base station, whether the base station performs beamforming, signal arrival distance of the base station, area of the area, population of the area, service related information to be provided to the area, or terrain properties of the area.

11. The computing device of claim 7, wherein the remainder candidate locations are identified by excluding unsatisfied candidate locations, which do not meet the predetermined condition, from the candidate locations in the area, and wherein the predetermined condition is to reduce duplication of coverage of the candidate locations with respect to the reference candidate location.

12. The computing device of claim 7, wherein the predetermined condition is to reduce shadow areas in the area with respect to the reference candidate location.

* * * * *